Patented Mar. 10, 1953

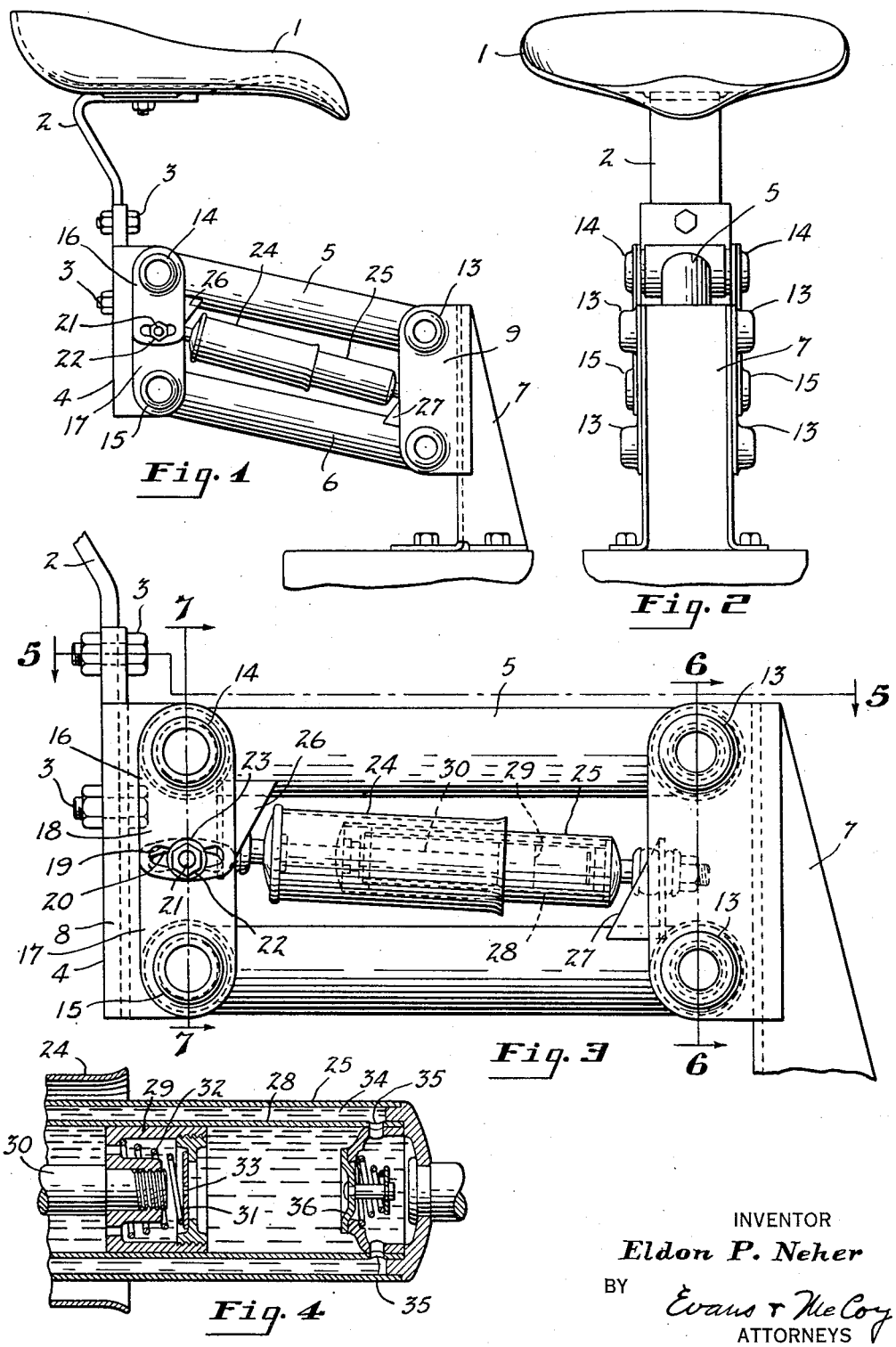

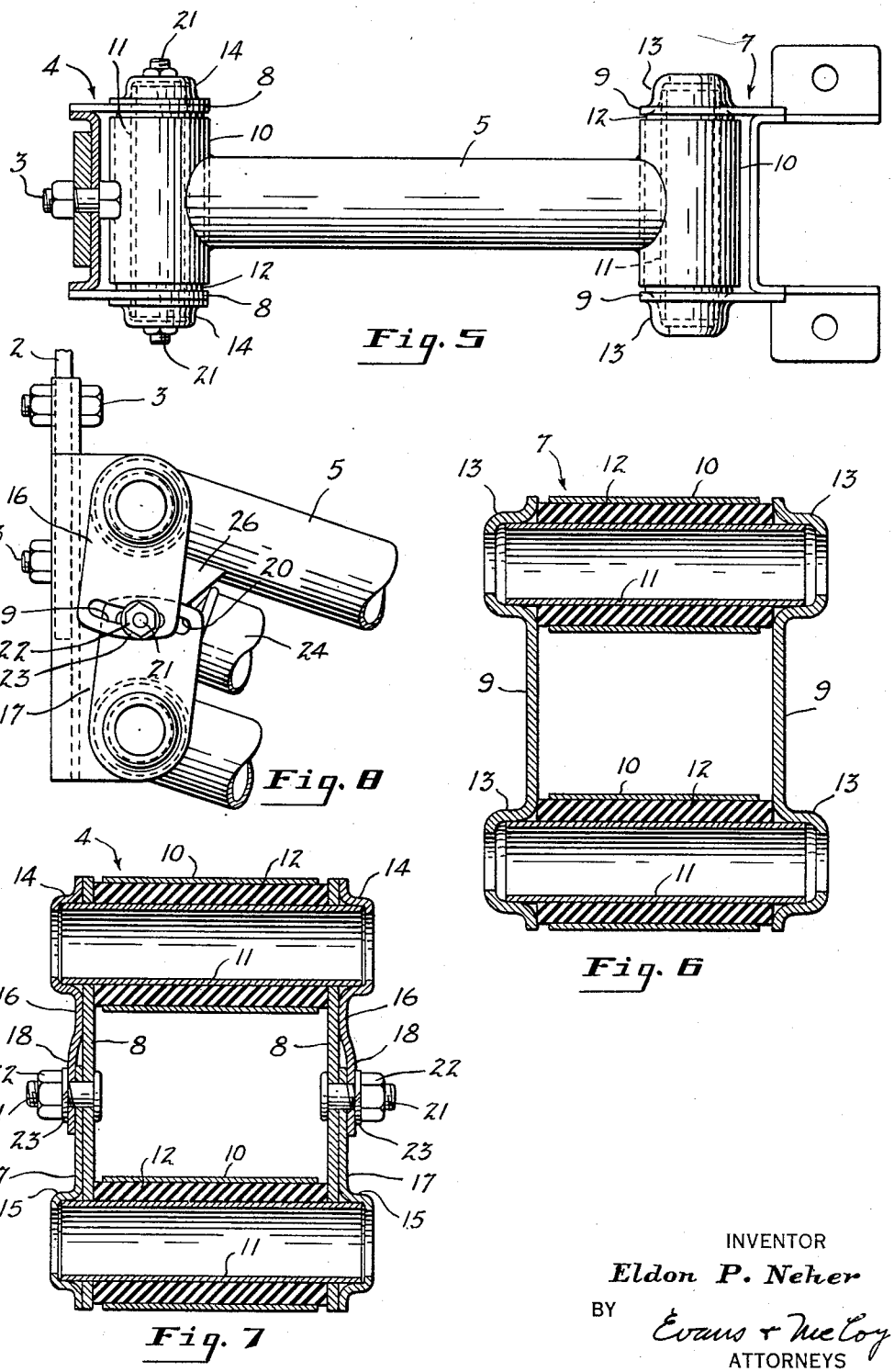

2,630,854

UNITED STATES PATENT OFFICE 2,630,854

TRACTOR SEAT

Eldon Paul Neher, North Manchester, Ind., assignor to The General Tire and Rubber Company, Akron, Ohio, a corporation of Ohio Application December 1, 1948, Serial No. 62,840

4 Claims. (Cl. 155—9)

This invention relates to load cushioning supports and more particularly to a cushioning support for the seats of tractors and the like.

The invention has for an object to provide a support in which torque cushioning means is associated with pivotal connections of the support and in which simple and convenient means is provided for varying the spring characteristics of the cushion.

With the above and other objects in view, the invention may be said to comprise the support as illustrated in the accompanying drawings hereinafter described, together with such variations and modifications thereof as will be apparent to one skilled in the art to which the invention pertains.

Reference should be had to the accompanying drawings forming a part of this specification in which:

Figure 1 is a side elevation of a tractor seat embodying the invention;

Fig. 2 is a front elevation of the seat;

Fig. 3 is a side elevation of the cushioning unit on an enlarged scale showing the supporting links in horizontal position;

Fig. 4 is a fragmentary section through the shock absorber taken on the line indicated at 4—4 in Fig. 3;

Fig. 5 is a top plan view of the cushioning unit viewed as indicated by line 5—5 in Fig. 3;

Fig. 6 is a vertical section taken on the line indicated at 6—6 in Fig. 3;

Fig. 7 is a vertical section taken on the line indicated at 7—7 in Fig. 3; and

Fig. 8 is a fragmentary side elevation showing the spring adjusting arms in an adjusted position.

In the accompanying drawings the invention is shown applied to a tractor seat and as herein illustrated the seat 1 is carried by a suitable supporting bracket 2 that is secured by suitable means such as bolts 3 to a vertically movable member 4. The member 4 forms part of a cushioning unit of the vertically swinging type, the member 4 being carried on the rear ends of vertically swinging links 5 and 6 which are substantially parallel. The links 5 and 6 are pivotally connected at vertically spaced points to the member 4 and at vertically spaced points to a suitable supporting standard 7, the standard 7 supporting the forward ends of the links 5 and 6 and the member 4 being supported by the rear ends of the links. The member 4 and standard 7 are preferably channel shaped members, the member 4 having side walls 8 between which the links 5 and 6 are received, and the standard 7 having side walls 9 between which the links are received.

The cushioning unit is made resiliently yieldable by the use of pivots of the torque cushioning type in which, as shown in Figs. 6 and 7, an outer tubular pivot member 10 is provided which may be rigidly secured to a supporting link, and an inner pivot member 11 is provided within the pivot member 10, the member 11 being of smaller diameter and of greater length than the pivot member 10. Between the inner and outer pivot members 10 and 11 there is interposed an elastic torque cushioning element in the form of a rubber bushing 12 which is connected interiorly and exteriorly to the inner and outer pivot members respectively. The rubber bushing 12 is preferably under radial compression between the inner and outer pivot members and this radial compression serves to create firm adhesion of the external and internal surfaces of the bushing to the outer pivot member 10 and inner pivot member 11. The inner pivot members 11 which project beyond the ends of the outer pivot members 10 and the bushings 12 are secured against turning movement in the member 4 and standard 7. The members 11 are so positioned in the member 4 and standard 7 that the cushioning pivots normally hold the links 5 and 6 in a position inclined upwardly from the standard 7, as shown in Fig. 1 of the drawings. Weight imposed upon the member 4 causes the links 5 and 6 to swing downwardly and turn the outer pivot members 10 with respect to the inner pivot members 11, such turning movement being yieldably resisted by the elastic rubber bushings. The action of each of the four bushings is the same and cushioning means is employed on all four of the pivots in preference to a lesser number of cushions for the reason that cushioning pivots of smaller size may be employed. It is also advantageous to employ a number of cushioning pivots for the reason that the support will continue to function after failure of one of the cushioning pivots.

In order to change the spring characteristics of the support the connections of certain of the inner pivot members to the walls in which they are supported are made adjustable so that the angle at which the links 5 and 6 are normally supported and the force necessary to move the links to horizontal position may be changed. The same result may be obtained by adjusting any of the inner pivots 11, but it is preferred to make the rear pivot members adjustable in the member 4 since the adjusting means is usually more conveniently accessible when mounted on the member 4. As shown herein, the inner pivot members 11 of the forward pivots are permanently secured to the side walls 9 of the standard 7, the walls 9 being provided with socket portions 13 which receive the projecting ends of the pivot members 11 which may be rigidly secured against turning movement in the sockets 13 by suitable means such as welding.

The inner pivot members 11 of the rear pivots are journaled in and project through openings in the side walls 8 of the member 4 and exteriorly of the walls 8 retaining caps 14 and 15 are secured to the upper and lower pivot members 11. The caps 14 and 15 have radial extensions 16 and 17 which may be in the form of arms bearing against the outer faces of the walls 8. The upper arms 16 have relatively offset end portions 18 that overlap the arms 17 and the overlapping portions of the arms 16 and 17 are provided with arcuate slots 19 and 20 that are formed concentric with the axes of the upper and lower pivots, respectively.

A bolt 21 is secured to each side wall 8 and projects through slots 19 and 20 of the arms 16 and 17, and the arms 16 and 17 are clamped to the outer faces of the walls 8 by means of nuts 22 and washers 23 on the bolts 21. To adjust the spring characteristics of the cushion the nuts 22 are loosened and the links 5 and 6 are swung upwardly from the position in which they are normally held by the rubber bushings of the forward pivots and secured in such position by tightening the nuts 22, thereby increasing the range of motion of the seat above the horizontal position of the links, or the links are swung downwardly and secured at a lesser inclination to lessen the range of motion of the seat above the horizontal position of the links.

Both of the rear pivot members 11 are preferably simultaneously adjusted in order to obtain a greater variation in spring characteristics for a given adjustment. In adjusting the seat for a heavy man the normal inclination of the links 5 and 6 is increased by lifting the seat and tightening the nuts 22, and to adjust the seat for a lighter man the inclination of the links 5 and 6 is decreased by pressing downwardly on the seat while the nuts 22 are being tightened.

In order to check rebound, a shock absorber is provided which is interposed between the links 5 and 6 in such manner as to retard upward movement of the links. As herein shown, an hydraulic shock absorber of conventional construction is employed, the shock absorber comprising telescopically connected tubular sections 24 and 25, the section 24 being pivotally attached at its rear end to the bracket 26 projecting from the under side of the link 5 adjacent its rear end, and the forward end of the section 25 being pivotally connected to a bracket 27 projecting upwardly from the lower link 6 adjacent its forward end. The shock absorber is thus connected to the links in such manner that it is elongated upon upward pivotal movement of the links 5 and 6.

As shown in Figs. 3 and 4, the section 25 of the shock absorber carries a cylinder 28 which receives a piston 29 that is attached by means of a piston rod 30 to the rear end of the section 24. Movement of the links 5 and 6 upwardly causes the piston 29 to move rearwardly in the cylinder 28, and this movement of the piston is retarded by a check valve 31 mounted in the piston. The valve 31 is held against its seat by pressure of the liquid in the cylinder upon rearward movement of the piston 29 and is moved away from its seat to permit free flow of liquid through the piston by pressure of the liquid acting on its front face and compressing a spring 32 which normally holds the valve lightly against its seat. In order to allow slow rearward movement of the piston in the cylinder, a small vent 33 is provided in the valve 31 which allows slow flow of liquid through the valve from the rear of the piston to the front thereof.

A liquid reservoir 34 is provided in the tubular section 25 surrounding the cylinder 28 and this reservoir communicates with the cylinder through openings 35 at the forward end of the cylinder. A check valve 36 permits flow into the cylinder but is closed by a pressure tending to force liquid from the cylinder to the reservoir, the valve 36 serving to trap liquid within the cylinder 28 and keep the cylinder full of liquid.

It is to be understood that variations and modifications of the specific devices herein shown and described for purposes of illustration may be made without departing from the spirit of the invention.

What I claim is:

1. A seat support comprising a supporting standard, a vertically movable seat carrying member, substantially parallel supporting links connected by vertically spaced horizontally disposed forward pivots to said standard and by vertically spaced horizontally disposed rear pivots to said carrying member, at least one forward pivot and at least one rear pivot being a torque cushioning pivot that comprises an outer tubular pivot member, an inner pivot member and an elastic rubber torque cushioning element interposed between and operatively connected to said pivot members to yieldingly resist relative turning movements thereof, each cushioning pivot having its outer pivot member fixedly secured to a link, said forward cushioning pivot having its inner pivot member fixed to said standard and being positioned to normally support its link with its rear end above its forward end, the inner pivot member of said rear cushioning pivot being rotatably mounted in said seat carrying member and having a radial extension fixed thereto and positioned alongside said seat carrying member, and fastening means for securing said radial extension to said seat carrying member in various positions of angular adjustment, said fastening means being releasable to permit the said inner pivot members to turn freely in said seat carrying member, whereby the seat carrying member may be adjusted by releasing said fastening means, lifting or depressing the seat carrying member and securing said extension to the seat carrying member while the seat carrying member is held in adjusted position.

2. A seat support such as defined in claim 1 in which the radial extension of the inner pivot member of the rear torque cushioning pivot has an arcuate slot concentric with its pivot member and in which a bolt carried by the seat carrying member extends through said slot, and in which a clamping nut on said bolt secures said extension to said seat carrying member in any one of several possible positions of angular adjustment.

3. A seat support comprising a supporting standard, a vertically movable seat carrying member, substantially parallel supporting links connected by vertically spaced horizontally disposed forward pivots to said standard and by vertically spaced horizontally disposed rear pivots to said seat carrying member, each of said pivots comprising an outer tubular pivot member, an inner pivot member and an elastic cushioning element interposed between and operably connected to said inner and outer pivot members to yieldably resist relative turning movements thereof, each of said outer pivot members being fixedly secured to a link, said forward pivots having their inner pivot members fixed to said standard and being positioned to normally yieldably support said links with their rear ends above their forward ends, the inner pivot members of the rear pivots being rotatably mounted in said seat carrying members and having radial extensions that overlap alongside said seat carrying members, the overlapping portions of said extensions having arcuate slots each concentric with its pivot member, a bolt fixed to said seat carrying member and passing through said slots, and a clamping nut on said bolt for clamping said extensions to said seat carrying member.

4. A seat support comprising a supporting standard having spaced side walls, a seat carrying member having spaced side walls, means for supporting said seat carrying member comprising substantially parallel links having their forward ends received between the side walls of said standard and their rear ends received between the side walls of said member, forward horizontal torque cushioning pivots connecting said links to said standard and rear horizontal torque cushioning pivots connecting said links to said seat carrying member, each of said pivots comprising an outer tubular pivot member fixed to its link and an inner pivot member and an elastic torque cushioning element interposed between and operably connected to the inner and outer pivot members to yieldably resist relative turning movements thereof, said forward pivots having their inner pivot members in fixed position in the side walls of the standard, said forward pivots being positioned to normally support the links in a position extending rearwardly from said standard and inclined upwardly therefrom, the inner pivot members of the rear pivots being mounted in said seat carrying members and journaled in the side walls thereof, the said pivot members having arms rigidly attached thereto and closely overlying the outer face of a side wall of the seat carrying member, and releasable fastening means for securing said arms to said seat carrying member in various positions of angular adjustment with respect thereto.

ELDON PAUL NEHER.

REFERENCES CITED

The following references are of record in the file of this patent:

UNITED STATES PATENTS

| Number | Name | Date |
| --- | --- | --- |
| 1,864,943 | Riddle | June 28, 1932 |
| 1,919,033 | Noble | July 18, 1933 |
| 1,960,939 | Hansen | May 29, 1934 |
| 2,008,209 | Herold | July 16, 1935 |
| 2,298,217 | Lemle | Oct. 6, 1942 |
| 2,334,922 | Gustafson | Nov. 23, 1943 |

FOREIGN PATENTS

| Number | Country | Date |
| --- | --- | --- |
| 772,751 | France | Aug. 20, 1934 |